United States Patent [19]

Hartman

[11] 4,215,330

[45] Jul. 29, 1980

[54] PERMANENT MAGNET PROPULSION SYSTEM

[75] Inventor: Emil T. Hartman, Detroit, Mich.

[73] Assignees: Ethel Hartman, Richmond, Ind.; Charles Helin, Estate of, Detroit, Mich. ; Detroit Bank and Trust Company, executor, part interest to each

[21] Appl. No.: 862,344

[22] Filed: Dec. 20, 1977

[51] Int. Cl.² .............................................. H01F 7/02
[52] U.S. Cl. ........................................ 335/306; 310/12
[58] Field of Search ...................................... 310/12–14, 310/15; 198/619, 381; 335/302, 306

[56] References Cited

U.S. PATENT DOCUMENTS

| 3,263,796 | 8/1966 | Parke | 310/12 X |
| 4,074,153 | 2/1978 | Baker | 310/12 |

OTHER PUBLICATIONS

*Magnets*, Underhill, p. 2, McGraw-Hill, 1929.

Angrist, "Perpetual Motion Machines," *Scientific American*, vol. 218, p. 119 (1968).

*Primary Examiner*—Donovan F. Duggan
*Attorney, Agent, or Firm*—Alex Rhodes

[57] ABSTRACT

A permanent magnet propulsion system wherein a steel ball is propelled up an inclined plane between two rows of permanent bar magnets, said magnets being in spaced relationship with all north seeking poles of one of the said rows facing in substantially the same direction and with all south seeking poles in the other row facing in substantially the same but opposite direction to the first of said rows. The magnetic axes of each of the magnets of the first said row are in staggered relationship to the axes of opposing magnets of the second said row. The magnetic field acting on the ball is configured whereby the ball after reaching the top of the inclined plane is able to drop from the said plane out of the field. A pair of parallel tracks positioned between the spaced rows of magnets guide the ball and a clamping means orient and retain the magnets.

15 Claims, 8 Drawing Figures

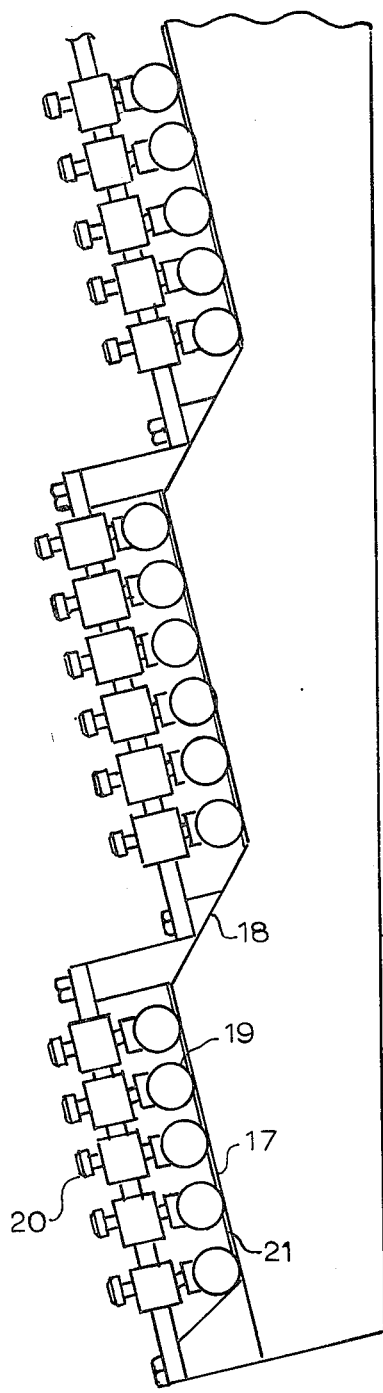
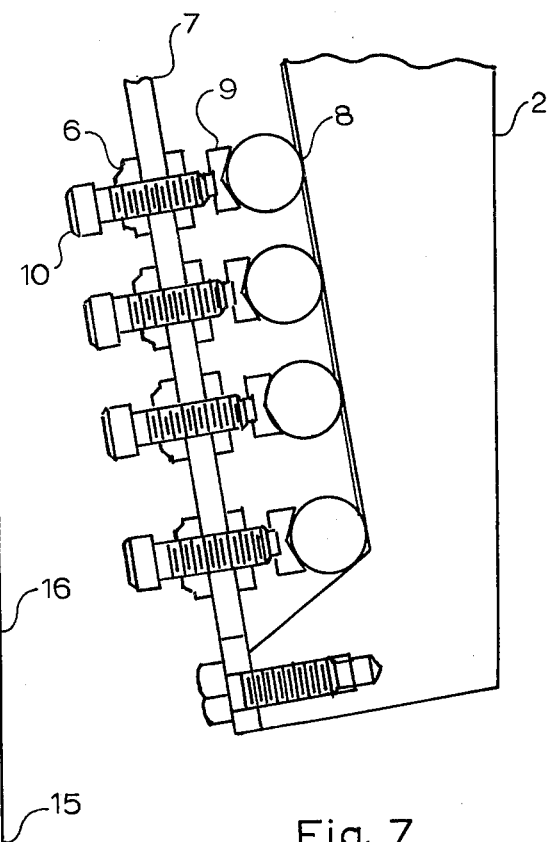
Fig. 7
Fig. 8

PERMANENT MAGNET PROPULSION SYSTEM

BACKGROUND OF THE INVENTION

The present invention relates to a new and novel device for propelling a steel ball upward along an inclined plane by the magnetic forces of an ordered arrangement of permanent magnets. It is intended that such a device could be used as a novelty or as a prime mover in conveyor systems, transportation systems, control systems and the like. It is obvious that this type of a system is pollution free and does not require complex supporting systems such as electrical distribution and control systems. It is also obvious that the present invention can be safely used in highly inflammable and explosive environments.

It is an object of the present invention to provide a simple, low cost means of propulsion which can replace other means of propulsion requiring complex mechanical, electrical and hydraulic arrangements driven by engines, electric motors and the like.

It is another object of the present invention to provide a device with high entertainment value for a novelty.

It is still a further object of the present invention to propel a steel ball upward along an inclined plane by the magnetic forces of permanent bar magnets and then without means other than gravity cause the ball to drop from the end of the plane entirely out of the magnetic field.

The foregoing objectives and features, along with additional objectives, features, advantages, and benefits of the invention, become more apparent in the ensuing description and accompanying drawings which disclose the invention in detail. A preferred embodiment is disclosed in accordance with the best mode presently contemplated in carrying out the invention. The subject matter in which an exclusive property is claimed is set forth in each of the numbered claims at the conclusion of the description and such subject matter is considered patentable over the prior art of which the applicant is aware, as set forth in the following Prior Art Statement.

PRIOR ART STATEMENT

A novelty search performed in connection with the present invention developed the following U.S. Pat. Nos. 868,316; 214,297; 2,875,695; 3,167,168; 3,263,796; 2,901,914; 3,788,447.

U.S. Pat. No. 868,316 discloses a mechanical movement wherein a novel combination of mechanical parts is employed to drive a plurality of balls for the purposes of providing a display, opening and closing of electric circuits, and the like.

U.S. Pat. No. 2,214,297 discloses an electromagnetic gun wherein magnetic particles are propelled at high volicities for shaping and cutting metal, stone or the like, by impact.

U.S. Pat. No. 2,875,693 discloses a hydraulic pump wherein a rotating magnetic field produces the movement of magnetic spheres enclosed within spiral tubing.

U.S. Pat. No. 3,167,168 discloses an electromagnetic conveyor wherein metal objects are transported by magnetic forces produced by electromagnets.

U.S. Pat. No. 3,263,796 discloses a magnetic conveyor wherein one embodiment comprises a permanent magnet having pole pieces which extend along the guideway such that the field intensity of the magnetic field produced by the magnet varies from a minimum value at the first position to a maximum value adjacent to the second position. The magnetic field is used for transferring cylindrical articles formed from magnetically susceptible material. At the end of the conveyor a discharge means is provided for disengaging the articles from the magnetic field.

U.S. Pat. No. 2,901,914 discloses a remote control device wherein a plurality of metallic balls contained in a tube are used for the transmission of motion and power.

U.S. Pat. No. 3,788,447 discloses a conveyor which is driven by a linear electromagnetic device.

This Prior Art Statement is furnished in compliance with applicant's duty of disclosure as defined in the Patent and Trademark Office Rules for patent cases.

BRIEF DESCRIPTION OF THE DRAWINGS

FIG. 7 is a cross-sectional view, taken along line 7—7 of FIG. 2, illustrating some features of the means for clamping the magnets to the base structure of the present invention.

FIG. 8 is a side view illustrating a further alternative embodiment of the present permanent magnet propulsion system wherein a series of upward and downward sloping inclines are provided.

DESCRIPTION OF THE PREFERRED EMBODIMENT

Figure 1:
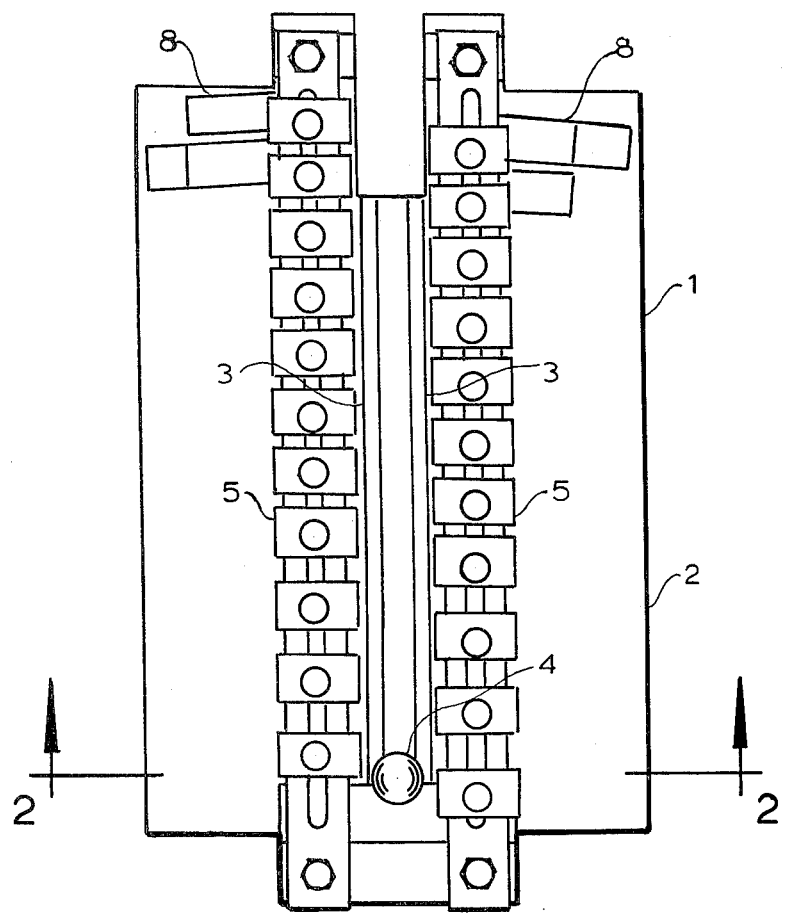
FIG. 1 is a plan view of one embodiment of the present magnetic propulsion system illustrating some of the principal features of the invention.
Figure 2:
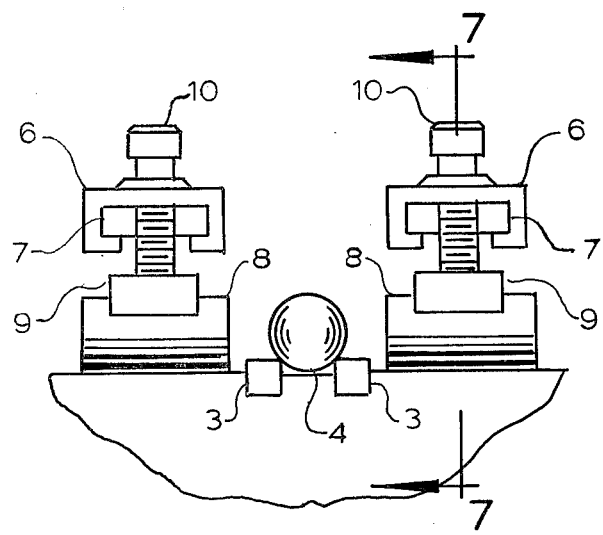
FIG. 2 is a cross-sectional view, taken along line 2—2 of FIG. 1, illustrating the positioning of a steel ball on a pair of tracks between a row o permanent magnets on either side of the said track.
Figure 3:
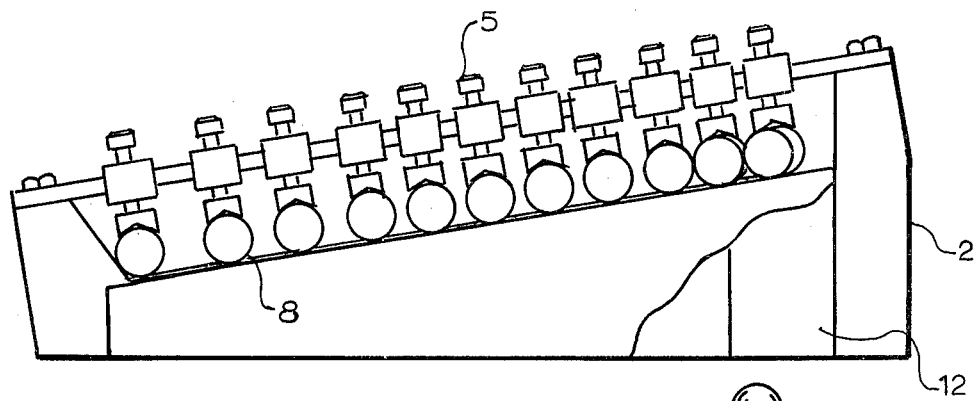
FIG. 3 is an end view showing a plurality of permanent magnets mounted on an inclined surface with a section broken out of said view to illustrate a ball dropping from the said inclined plane out of the magnetic field.

With reference to the accompanying drawings, in FIG. 1 is shown in plan view the preferred embodiment 1 of the present invention. A ball 4 constructed from some ferro-magnetic material is positioned centrally upon the upper surface of a base structure 2. The material of which the ball 4 is constructed may be either an iron alloy or some other ferro-magnetic material capable of being acted upon by a magnetic field. The ball 4 is guided and supported by a pair of parallel tracks 3. The manner of locating and supporting the ball 4 is best illustrated in FIG. 2 wherein the tracks 3 are shown having a square section retained by the base structure 2.

On either side of ball 4, spaced outwardly from each of the tracks 3 is a row of permanent magnets 8. The magnets 8 are so arranged that in one of the said rows all north seeking poles point towards the corresponding adjacent track 3 while in the other said row all of the south seeking poles point towards the corresponding adjacent track 3. The ordered arrangement of permanent magnets increases the intensity of the magnetic field in an upward direction along the inclined base structure.

Figure 4:
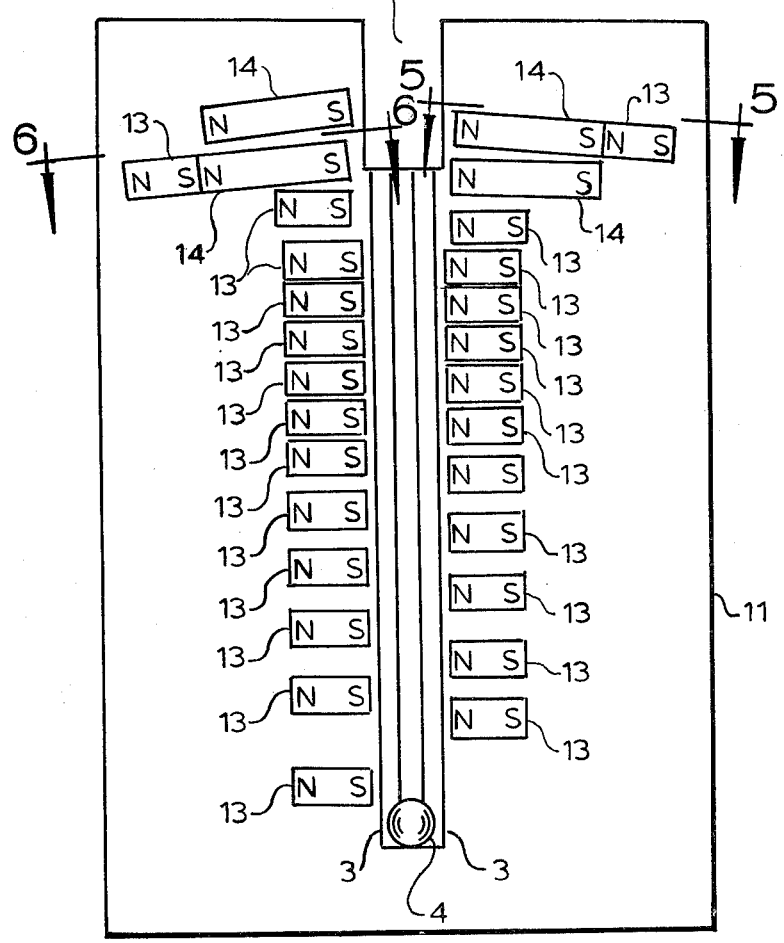
FIG. 4 is a plan view drawn to one-half scale of an actual model which was constructed to demonstrate the operability of the present invention.

With reference to FIG. 4, a half scale plan view of a model which is constructed in accordance with the present invention whereby a one-half inch diameter steel ball 4 was propelled upward along an inclined surface by the magnetic field of an ordered arrangement of permanent magnets 13 and 14. Upon reaching the top of the inclined surface the ball 4 dropped vertically through a notch 12 in the base structure 11 entirely out of the magnetic field without being acted upon by any additional force other than the force of gravity.

In the model illustrated in FIG. 4 tracks 3 were constructed from one-quarter inch square aluminum spaced approximately one-quarter inch apart. Optionally some other type of para-magnetic material could have been used for tracks 3 provided the influence of the material was a minimum. The top surface of base structure 11 onto which tracks 3 were mounted was inclined at an angle of 4°7' with respect to a horizontal plane. Magnets 13 and 14 were one-half inch diameter Alnico permanent magnets of one and two inch lengths, respectively.

It should be noted in FIG. 4 that magnets 13 and 14 are so arranged that their magnetic axes are generally perpendicular to tracks 3, however, at the upper end of base structure 11 adjacent to notch 12 the magnetic axes are slightly oblique to tracks 3. Furthermore, the magnetic axes of magnets 13 and 14 in one of the said rows are in staggered relationship to the magnetic axes of magnets 13 and 14 of the other said row. In addition, the spacing between some of the magnetic axes of adjacent magnets 13 and 14 decreases in the direction of the movement of ball 4.

Figure 6:
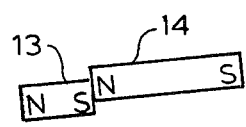
FIG. 6 is a cross-sectional view, taken along line 6—6 of FIG. 4, illustrating the spatial relationship between a second pair of magnets of FIG. 4.
Figure 5:
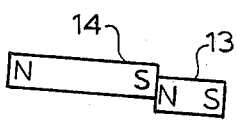
FIG. 5 is a cross-sectional view, taken along line 5—5 of FIG. 4, illustrating the spatial relationship between a pair of magnets of FIG. 4.

In order to achieve the result whereby ball 4, after reaching the end of the incline on base structure 11 would drop vertically from the said incline and escape out of the magnetic field, it was necessary to space magnets 13 and 14 farther away from tracks 3 in the vicinity of notch 12 and to also provide the combination of magnets 13 and 14, shown in FIG. 4, in the vicinity of the said notch 12. As noted in FIGS. 5 and 6, magnets 13, positioned at the outboard ends of magnets 14, were displaced vertically upward.

Associated with each of the permanent magnets, prior to their use with the other magnets, is a magnetic field whose lines of force extend from the north to south poles thereof. When the magnets and ball are brought together, in the novel arrangement heretofore described, the mutual actions of the fields of the separate magnets and the induced field of the ferro-magnetic ball is such as to produce a complex field which causes the ball to be propelled up the inclined plane between the tracks and to drop from the end thereof.

It is obvious that what I have shown in FIG. 4, which produced the new and novel results whereby a ferro-magnetic ball was propelled upward along an inclined plane and caused to drop vertically from the said plane, is an ordered arrangement of permanent magnets 13 and 14 in combination with a pair of tracks 3. It is also obvious that drawing from the features disclosed, other embodiments can be constructed. For example, a ferro-magnetic ball can be propelled along a pair of parallel tracks on a horizontal surface using an arrangement of magnets, all of the same length, by varying their positions. Furthermore, different size magnets can be used in substitution of decreasing the spacing between the magnetic axes of adjacent magnets or increasing the distance of the magnets from the tracks 3.

A means 5 for clamping and positioning each of the magnets 8 of FIG. 1 is illustrated in FIGS. 2 and 7 wherein a clamping force is exerted upon each of said magnets 8 by an inverted V-block 9. Directly above the V-block 9 is an adjusting screw 10, said screw 10 engaging a circular depression on the top side of V-block 9. Adjusting screw 10 is threadably engaged with a slideable member 6 wherein said member 6 contains a T-slot for engaging member 6 with a guide bar 7. Guide bar 7 incorporates a central slot through which the body of adjusting screw 10 extends to allow the said screw 10 to engage the V-block 9. Guide bar 7 is affixed at its ends to base structure 2. So that clamping means 5 may not influence the magnetic field of the magnets 8, V-block 9, adjusting screws 10, slideable members 6 and guide bar 7 must be constructed from para-magnetic materials such as aluminum.

In FIG. 8 is illustrated a further alternative embodiment 15 of the present invention wherein the top surface of a base structure 16 comprises a plurality of pairs of an upward sloping surface 17 followed by a downward sloping surface 18. On each of the upward sloping surfaces 17, in accordance with the previously disclosed features of the present invention is mounted a pair of parallel tracks 21, a row of permanent magnets 19 positioned outboard of and adjacent to said tracks 21 and a clamping means 20 for retaining and positioning said magnets 19. A model of this alternative embodiment 15 was constructed whereby a one-half inch steel ball was consecutively propelled up each of the upward sloping surfaces 17 and caused to move down each of the downward sloping surfaces 18.

In summary, the present invention provides a new and novel device for propelling a ball constructed from a ferro-magnetic material upward along an inclined plane by the magnetic forces of an ordered arrangement of permanent magnets. It is apparent from the accompanying figures and specifications what has been achieved is a device which could be used as a novelty or as a prime mover in conveyor systems, transportation systems, control systems and the like. It is still further apparent that this type of system is pollution free and does not require complex supporting systems such as electrical distribution and control systems. It is also apparent that the present invention can be safely used in highly inflammable and explosive environments.

What I claim as new is:

1. A propulsion system wherein an ordered arrangement of permanent magnets provides the propulsion force comprising: a base structure; a pair of tracks mounted on top of said base structure, said tracks being in spaced parallel relationship to each other; a first row of permanent magnets mounted on top of said base structure, directly outboard from and adjacent to one of said tracks, with all of the north seeking poles of said row of magnets pointed towards said tracks and all of the south seeking poles pointed away from said track; a second row of permanent magnets mounted on top of said base structure, directly outboard from and adjacent to the other of said tracks, with all of the south seeking poles of said second row of magnets pointed towards said other track and all of the north seeking poles pointed away from the other said track; at least one ball positioned between and supported by said tracks, said ball being constructed from a ferro-magnetic material whereby the magnetic field of said first and second row of magnets propels said ball along said tracks; and a clamping means for positioning and retaining each of the magnets of said first and second rows onto said base structure.

2. A permanent magnet propulsion system according to claim 1 wherein the top surface of said base structure is substantially horizontal.

3. A permanent magnet propulsion system according to claim 1 wherein the top surface of said base structure is inclined.

4. A permanent magnet propulsion system according to claim 1 wherein said magnets are positioned such that the distance some of said magnets are mounted outboard from said tracks increases in the direction of ball movement whereby said ball after being propelled to the top of the inclined plane may descend vertically out of the magnetic field of said magnets.

5. A permanent magnet propulsion system according to claim 1 wherein said magnets are arranged such that the magnetic axes of the magnets of one of said rows are in staggered relationship to the magnetic axes of the magnets of the other of said rows.

6. A permanent magnet propulsion system according to claim 1 wherein more than one ferro-magnetic ball positioned between and supported by said tracks is propelled by the magnetic field of said first and second rows of magnets.

7. A permanent magnet propulsion system according to claim 1 wherein the spacing between the magnetic axes of adjacent magnets in either of said rows decreases in the direction of movement of said ball whereby the magnetic field acting on said ball increases in the direction of said movement.

8. A permanent magnet propulsion system according to claim 1 wherein the size of the magnets in either of said rows increases in the direction of movement of said ball whereby the magnetic field acting on said ball increases in the direction of said movement.

9. A permanent magnet propulsion system according to claim 1 wherein said magnets are arranged such that all of the magnetic axes of said magnets are perpendicular to said tracks.

10. A permanent magnet propulsion system according to claim 1 wherein said magnets are arranged such that some of the magnetic axes of said magnets are perpendicular to said tracks and the remainder of the magnetic axes of said magnets are oblique to said tracks.

11. A permanent magnet propulsion system according to claim 1 wherein said clamping means comprises: a guide bar mounted onto said base structure, aligned with and positioned directly above each of said rows of magnets and having a vertical slot extending through the center of said bar; a plurality of slideable members retained by each of said guide bars, each of said slideable members corresponding to one of said magnets and having a T-slot for engaging said guide bars; a plurality of adusting screws, each of said screws being in threaded engagement by one of said slideable members and extending through the slot of one of said guide bars; and a plurality of V-blocks, each of said blocks having an inverted V-notch engaging one of said magnets and a circular depression on the top side thereof engaging one of said adjusting screws whereby a clamping force is exerted upon said magnet for positioning and retaining said magnet onto said base structure.

12. In a permanent magnet propulsion system the combination of: a pair of spaced parallel tracks; and a row of permanent magnets mounted directly outboard from each of said tracks with all north seeking poles of the magnets of one of said rows being adjacent to one of said tracks and all south seeking poles of the magnets of the other of said tracks being adjacent to the other of said tracks.

13. In a permanent magnet propulsion system the combination as set forth in claim 12 wherein the magnetic axes of the magnets in one of said rows are in staggered relationship to the magnetic axes of the magnets in the other of said rows.

14. In a permanent magnet propulsion system the combination as set forth in claim 12 wherein said magnets are arranged such that in the direction of propulsion the distance from some magnets to the adjacent track corresponding thereto increases.

15. A propulsion system wherein an ordered arrangement of permanent magnets provides the propulsion force comprising: a base structure having a top surface, said surface having a plurality of pairs of an upward sloping surface followed by a downward sloping surface; a pair of tracks mounted on top of said base structure, said tracks being in spaced parallel relationship to each other in alignment with each upward sloping surface and each downward sloping surface; a first row of permanent magnets mounted on each upward sloping surface of said base structure, directly outboard from and adjacent to one of said tracks, with all north seeking poles of the magnets of said row pointed towards said track and all of the south seeking poles pointed away from said track, said magnets being arranged such that their magnetic axes are substantially perpendicular to said track, the spacing between said axes decreases in the direction of propulsion and the distance from some of said magnets to said adjacent track increases in the direction of propulsion; a second row of permanent magnets mounted on each upward sloping surface of said base structure, directly outboard from and adjacent to the other of said tracks, with all south seeking poles of said second row pointed towards said other track and all of the north seeking poles pointed away from said other track, the magnets of said second row arranged such that their magnetic axes are substantially perpendicular to said other track in staggered relationship to the magnetic axes of said first row with the spacing between said axes decreasing in the direction of propulsion and the distance of some magnets to the adjacent track increasing in the direction of propulsion at least one ball positioned between and supported by said tracks, said ball being constructed from a ferro-magnetic material whereby the magnetic fields of said magnets propels said ball along each of said upward sloping surfaces whereupon said ball descends along the following downward sloping surface; and a clamping means for positioning and retaining said magnets onto said base structure.

* * * * *